(12) United States Patent
Duignan

(10) Patent No.: US 8,573,346 B2
(45) Date of Patent: Nov. 5, 2013

(54) AUXILIARY POWER DRIVEN UNIT FOR A BICYCLE

(76) Inventor: Michael Dale Duignan, San Pedro, CA (US)

(*) Notice: Subject to any disclaimer, the term of this patent is extended or adjusted under 35 U.S.C. 154(b) by 59 days.

(21) Appl. No.: 12/987,045

(22) Filed: Jan. 7, 2011

(65) Prior Publication Data

US 2011/0168471 A1    Jul. 14, 2011

Related U.S. Application Data

(60) Provisional application No. 61/293,305, filed on Jan. 8, 2010.

(51) Int. Cl.
*B62K 11/10* (2006.01)

(52) U.S. Cl.
USPC ................ 180/205.7; 180/206.8

(58) Field of Classification Search
USPC .......... 180/205.2, 205.7, 206.8, 207.3
See application file for complete search history.

(56) References Cited

U.S. PATENT DOCUMENTS

| | | | |
|---|---|---|---|
| 1,158,311 A * | 10/1915 | Schunk | 180/221 |
| 2,574,824 A | 11/1951 | Garelli | |
| 2,586,082 A * | 2/1952 | Piatti | 180/221 |
| 3,339,659 A | 9/1967 | Wolf | |
| 3,912,039 A | 10/1975 | Ordemann | |
| 3,966,007 A * | 6/1976 | Havener et al. | 180/220 |
| 4,200,164 A * | 4/1980 | Pearne | 180/205.7 |
| 4,267,898 A | 5/1981 | Wheaton | |
| 4,364,448 A | 12/1982 | Ikuma | |
| 4,579,188 A | 4/1986 | Facer | |
| 4,685,692 A | 8/1987 | Fullilove et al. | |
| 4,950,971 A | 8/1990 | Hegi et al. | |
| 5,078,227 A | 1/1992 | Becker | |
| 6,336,516 B1 | 1/2002 | McNelly | |
| 6,497,299 B1 * | 12/2002 | Sinclair et al. | 180/206.8 |

* cited by examiner

*Primary Examiner* — Kevin Hurley
(74) *Attorney, Agent, or Firm* — Christie, Parker & Hale, LLP

(57) ABSTRACT

An auxiliary, removable, modular power drive unit has a pivot point that can be attached to any bicycle or vehicle by way of a quick release clamp system. The power for the drive system may be derived from an internal combustion engine or electric motor. The power developed by the engine or motor is delivered to the rear wheel of a bicycle by a friction drive wheel that presses directly onto the tire of the bicycle. The power unit may utilize a clamp joined to an integrated fuel cell by a pivot point, causing the fuel cell to act as a swing arm and a motor mount. This enables the fuel cell to move up and down to compensate for different tire sizes, variations in road conditions, or movement of a suspension system of the bicycle due to imperfections in terrain.

15 Claims, 4 Drawing Sheets

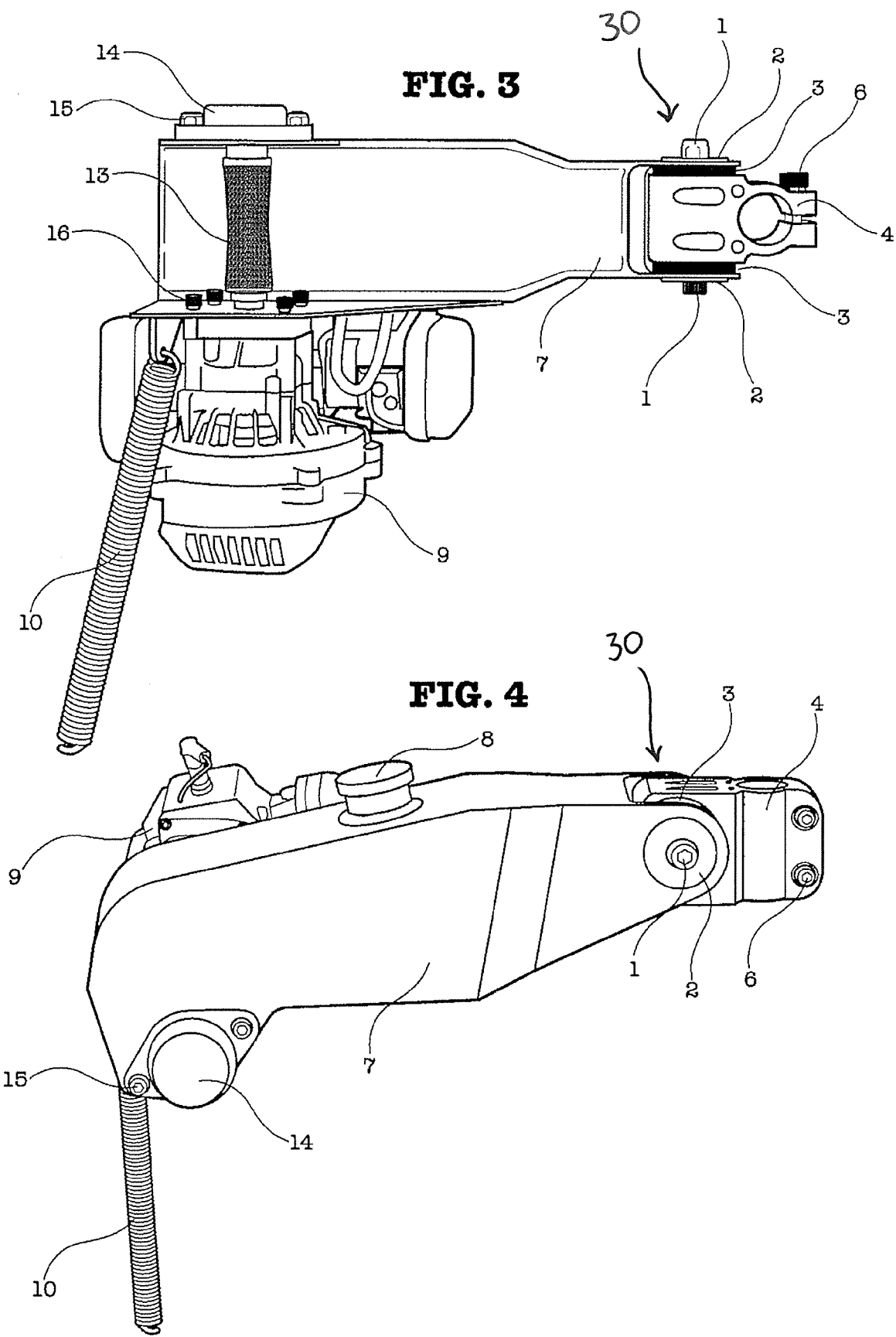

200
AUXILIARY POWER DRIVEN UNIT FOR A BICYCLE

CROSS-REFERENCE TO RELATED APPLICATION

This application claims the benefit of U.S. Provisional Application No. 61/293,305, filed Jan. 8, 2010, the contents of which are expressly incorporated herein by reference in its entirety.

FIELD OF INVENTION

This invention relates to an auxiliary drive system for vehicles, and more particularly to a motor drive for a conventional or suspension-based pedal-operated bicycle.

BACKGROUND

It is well known that bicycles are designed to be driven by the leg power of a rider. The rider actuates a pedal system to transmit motion to the rear wheel of the bicycle by way of a chain drive. In many cases, pedal power is augmented by a transmission that alters the force required on the pedals by shifting the chain drive to sprockets of different size associated with the rear wheel of the bicycle. The sprockets are arranged in a cassette and act to provide the chain drive with different pinion ratios. Some bicycles include front or rear suspensions that provide springs or shock absorbers between the bicycle seat and the wheel, to absorb bumps and dips by allowing the wheel to move with respect to the bicycle seat.

Auxiliary power drives are known using electric or internal combustion motors to apply power to either the front or rear wheel of a bicycle. These devices often use friction drives to engage the bicycle wheel to provide forward motion of the bicycle without pedaling. Such devices have been proposed for attachment to conventional bicycles. However, prior friction drive units are typically rather large and bulky, occupying significant space around or near the bicycle frame, and offsetting the center of gravity and balance of the bicycle. These drive units are often difficult to engage or disengage from the bicycle. Mounting the unit to the bicycle requires significant time and the use of external tools. Upon reaching a destination, the drive unit cannot be easily removed to store the bicycle. Some drive units are permanently attached to the bicycle frame, limiting the flexibility of use of the bicycle as well as the drive unit. Additionally, these drive units often cannot be used on a bicycle with a rear suspension, as the drive unit components and mounting equipment cannot accommodate movement of the rear tire relative to the bicycle frame. Also, some prior drive units accelerate wear of the bicycle tire, beyond the normal wear caused by the road or ground surface.

Therefore, there remains a need for a drive unit for a bicycle that is easier to engage and disengage from the bicycle, and that can accommodate a bicycle with a rear suspension, without causing excessive tire wear.

SUMMARY OF THE INVENTION

An auxiliary power assisted drive system according to an embodiment of the invention has an electric motor or an internal combustion engine that can be mounted to or removed from a bicycle seat post via a quick release clamping system, without external tools or special training. The motor may be supported on an arm or bracket that incorporates a fuel source such as a fuel tank. The arm or bracket acts as a beam that attaches the motor to the bicycle and allows for movement up and down about a pivot point attached to the clamping system. This permits the motor to be held against the tire of the bicycle even as a suspension system of the bicycle operates. Power is transferred to the wheel of the bicycle by way of a friction drive system including a spindle that frictionally engages the bicycle tire.

According to an embodiment, the powered friction-driving device can be used on a bicycle with or without a suspension system and can accommodate wheel movement due to uneven road surfaces. The device can be removed and re-installed to the same or a different bicycle without the use of tools, by way of the detachable quick-release clamping system. This enables the device to be reconfigured easily to conditions of normal riding, maintenance or storage.

In one embodiment, a power unit is provided for a bicycle having a seat post and a wheel with an axis. The power unit includes a motor having an output shaft configured to drive the wheel, a clamp dimensioned to clamp to the seat post of the bicycle, and a pivotal joint connecting the clamp to the motor. The pivotal joint pivots about a horizontal axis parallel with the axis of the wheel, for movement of the motor with respect to the clamp.

In one embodiment, a bicycle system having a power unit for driving the bicycle includes a bicycle, where the bicycle has a frame, a wheel coupled to the frame, a seat tube coupled to the frame, and a seat post received by the seat tube. The wheel is configured to rotate about a wheel axis. The system also includes a power unit removably attached to the bicycle. The power unit includes a motor operatively coupled to the wheel to rotate the wheel, a clamp removably clamped to the seat post, and a joint between the motor and the clamp. The joint allowing pivoting movement of the motor with respect to the clamp.

The above mentioned and other features and advantages of this invention and the manner of attaining them will become more apparent and the invention itself will be best understood by reference to the following description of embodiments of the invention taken in conjunction with the accompanying drawings.

BRIEF DESCRIPTION OF THE DRAWINGS

FIG. 3 is a bottom plan view of the auxiliary power drive device of FIG. 1 illustrating a friction drive spindle and a quick release clamping system of the device.

FIG. 4 is a side perspective view of the auxiliary power drive device of FIG. 1 showing details of a pivot point, support bearing and spring used for tension of the unit against a wheel of a bicycle.

DETAILED DESCRIPTION

This invention relates to an auxiliary drive system for vehicles, and more particularly to a motor drive for a conventional or suspension-based pedal-operated bicycle. The drive system includes a motor configured to frictionally drive the rear wheel of the bicycle, and a clamp that attaches to the seat post of the bicycle. A pivotal joint is connected between the clamp and the motor. This joint enables the motor to pivot up and down relative to the clamp, pivoting about a horizontal axis. This pivoting movement enables the drive system to accommodate a bicycle with a rear suspension, which allows the rear wheel to move with respect to the seat post. When the bicycle encounters bumps, dips, or other surface irregularities, the rear suspension enables the rear wheel to move up or down relative to the bicycle seat. To accommodate this suspension, the drive system includes the horizontal joint that allows the motor to move with the rear wheel, relative to the clamp mounted to the bicycle seat post. Additionally, the drive system includes a spindle with a concave surface that frictionally engages the outer tread of the bicycle tire, driving the tire forward while reducing slip and tire wear. In an embodiment, the spindle axis, bicycle wheel axis, and pivotal joint axis are parallel. This configuration enables the spindle to remain in driving engagement with the tire tread throughout any up and down motion of the wheel relative to the bicycle frame.

Figure 1:
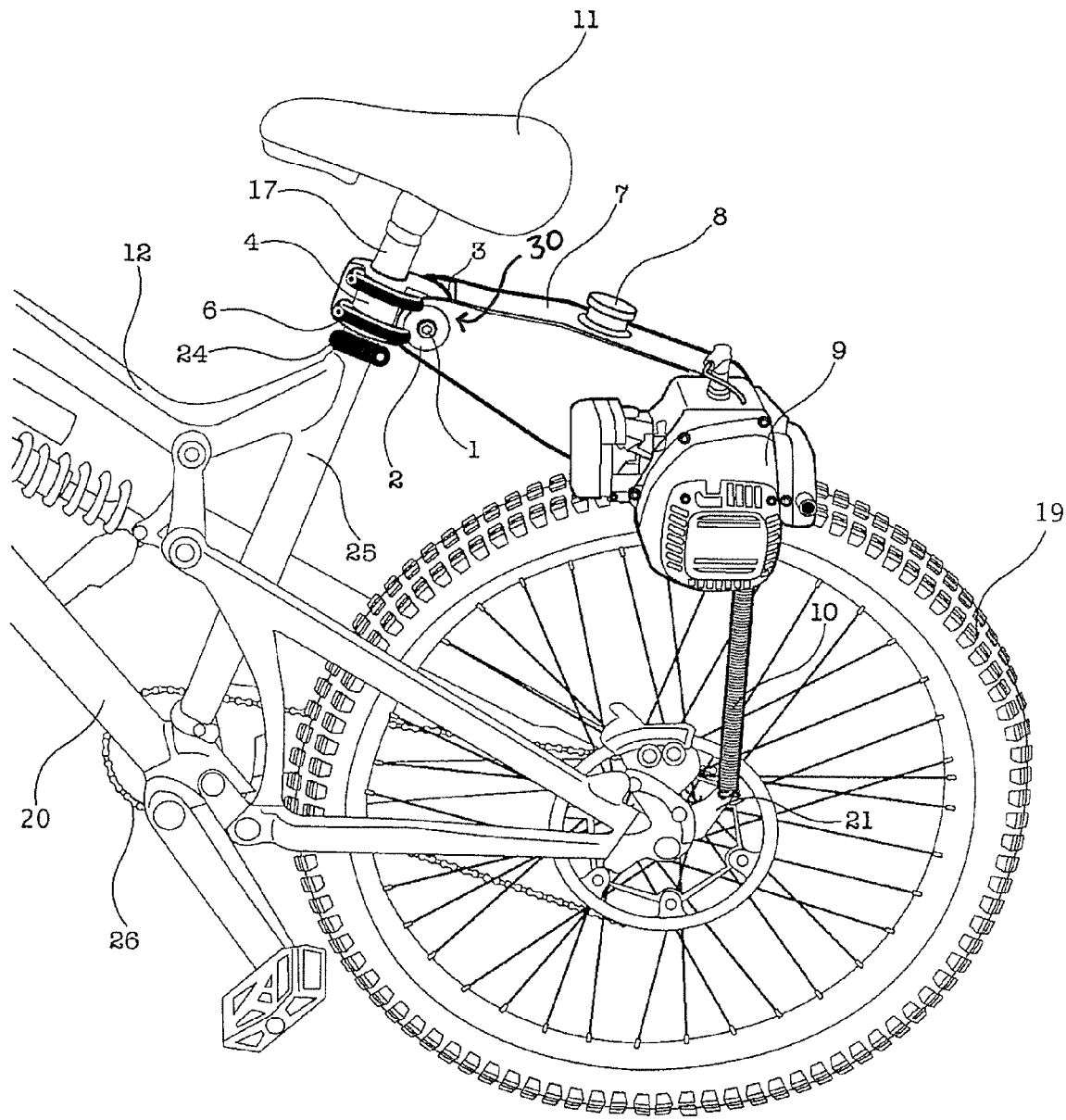
FIG. 1 is a side perspective view of an auxiliary power drive unit constructed in accordance with an embodiment of the invention and mounted to a bicycle.

FIG. 1 illustrates an exemplary embodiment of a compact, self-contained auxiliary power drive unit mounted to a bicycle frame 20, and more particularly to a seat post 17 such that it can be removed and re-installed without the use of external tools. The power drive unit has a motor 9 mounted for frictional engagement with a tire 19 of the bicycle. The power drive unit also has a clamp 4 for clamping the unit to the bicycle, and a joint 30 between the motor 9 and the clamp 4, for pivotal movement of the motor relative to the clamp.

When an operator wishes to engage the unit, he or she simply attaches the clamp 4 of the unit to the bicycle. In one embodiment, the user attaches the clamp 4 to the seat post 17. The joint 30 connects the clamp 4 to the motor 9. The operator then engages a tension spring 10 to draw the device downwardly against the tire. The tension spring is engaged by pulling it in a downward motion and connecting it to the bicycle frame 20, to the wheel axle, or to a spring bracket 21 installed near the axle of the bicycle wheel. The operator then attaches a throttle control 22 to a handle bar 23 of the bicycle and starts pedaling the bicycle in conventional fashion. This pedaling motion causes a friction drive spindle 13 driven by the motor of the power drive unit to rotate against the wheel 19 of the bicycle, starting the motor 9 of the device. The operator may then ride the bicycle as a conventional motorcycle or motorized bicycle would be ridden. When the operator is finished riding the bicycle in its motorized form, the drive unit can simply be removed by reversing the installation process and can easily be stowed in a normal back pack, placed in a suitable case, or otherwise stored for future use.

The structure of the power drive unit and its attachment to the bicycle will now be described in greater detail. In one embodiment, the power drive unit is mounted to the seat post 17 of the bicycle. The seat post 17 is received into a bicycle seat tube 25 and adjusted to provide the desired height of the seat 11. The seat post 17 is used as a mounting point for the auxiliary power drive unit due to its strength and integrity when inserted partially into the bicycle seat tube 25. Placement of a tube inside another tube of slightly larger diameter essentially doubles the strength of the combination and therefore provides a secure mounting location for the power drive unit. The seat post 17 is held securely in place by a seat post clamp 24 that is u-shaped to surround the seat tube 25 into which the seat post 17 is inserted. A bolt draws the ends of the u-shaped clamp together, tightening the clamp around the seat tube 25 to secure the seat post 17. In an embodiment, this seat post clamp 24 that clamps the seat post 17 to the seat tube 25 is independent of the power drive unit, and is not directly attached to the power drive unit.

The auxiliary power drive unit is attached to the seat post 17 above the tube 25 and above the seat post clamp 24 by a quick release clamp system. In one embodiment, the clamp system includes a bracket 32 (see FIG. 2). The bracket 32 includes the clamp 4 at one end and the joint 30 at the opposite end. In particular, the bracket 32 includes a clamp 4 designed to attach to the seat post 17. The particular clamp of FIG. 2 uses a pair of quick release camming skewers or levers 6 to force each side of clamp 4 together to achieve clamping pressure sufficient to hold the power assist unit in place on the seat post 17 or frame 20. In different embodiments, the clamp 4 may attach the power drive unit directly to the seat-post 17 of a bicycle, or to any part of the bicycle frame 20. In the case where the device is clamped to the seat post 17, it can be positioned at any point along the seat post. This enables the user to adjust the device to provide sufficient clearance of components despite differences in configuration between different bicycles or different desired orientations of the drive spindle 13, both fore and aft.

Figure 2:
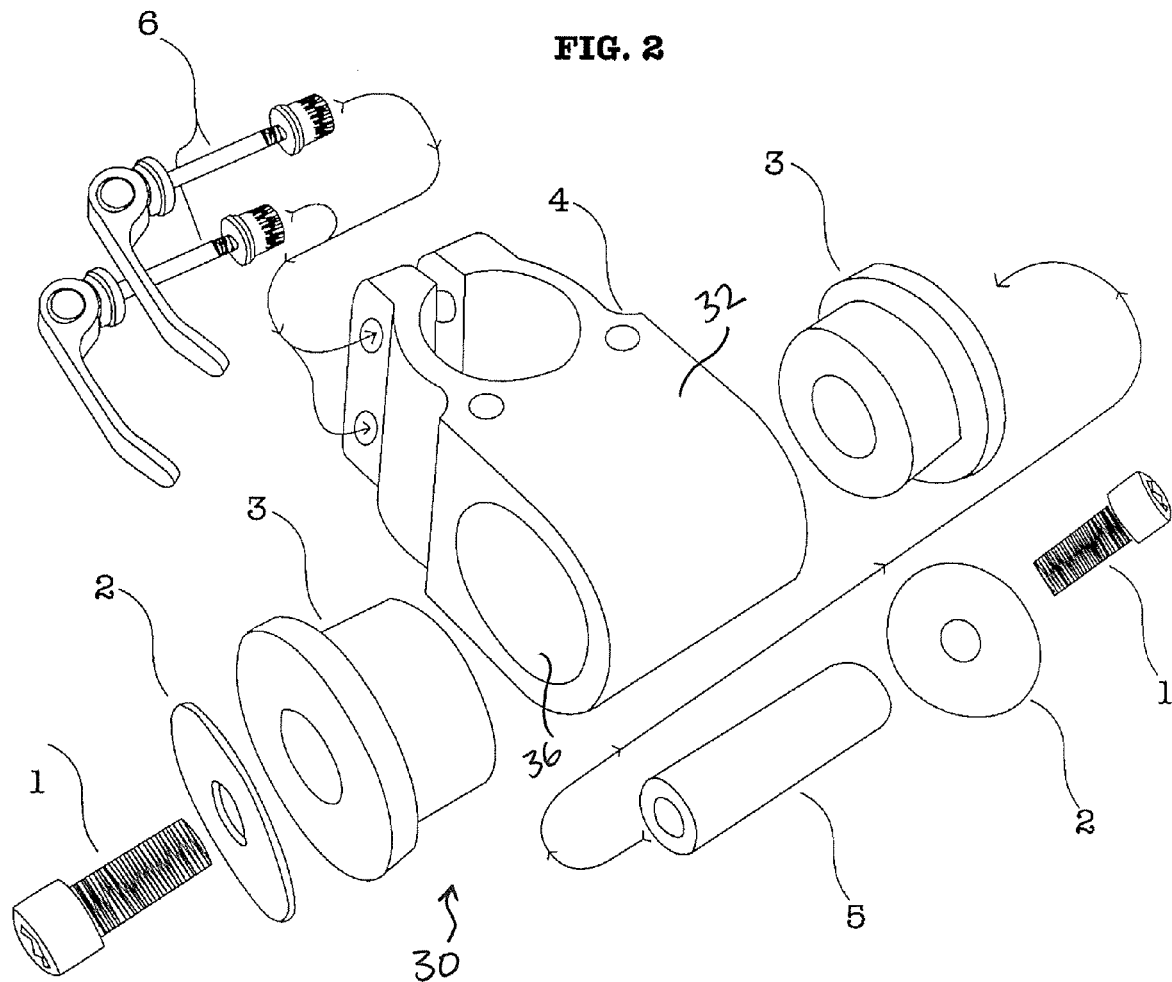
FIG. 2 is an exploded perspective view of a clamping device of the auxiliary power drive device of FIG. 1.

In the embodiment of FIG. 2, the clamp 4 includes two arms that are urged together by the levers 6. To attach the clamp 4 to the seat post 17, the seat is removed from the bicycle, and the clamp 4 is passed over the top of the seat post 17 and slid down to the desired location along the seat post 17. Alternatively, the clamp 4 could be designed to open wide enough to receive the seat post 17 into the opened clamp without removing the bicycle seat. In either case, the seat post 17 is received into the clamp 4, and the levers 6 are engaged to urge the arms of the clamp toward each other, tightening the clamp around the seat post 17.

In one embodiment, the clamping system that enables mounting the power unit to any bicycle is a quick disconnect pinch-type clamp that utilizes a camming quick release skewer or lever to force the clamp to constrict around the bicycles seat post. The clamp may be made from light weight aluminum or alternatively it may be made from steel or composite materials.

In the embodiment of FIG. 2, the joint 30 is located directly behind the clamp 4. The joint 30 can be integrated into the clamp system, or can be separately coupled between the clamp system and the motor 9. The joint 30 provides a pivotal connection between the motor 9 and the clamp 4, enabling the motor to pivot with respect to the claim 4 and thus the bicycle seat post 17 and frame 20. This freedom of motion of the motor 9 with respect to the clamp 4, seat post 17, and frame 20 enables the power drive unit to operate on bicycles with rear suspensions. As the rear suspension allows the rear wheel to move up or down with respect to the bicycle frame and seat, the joint 30 allows the motor to move along with the wheel, without dislodging the clamp or losing contact with the bicycle tire. This enables power to be applied efficiently to the tire of virtually any bicycle, including both bicycles having modern suspension systems and bicycles of the non-suspension type.

In one embodiment, the joint 30 is formed at the connection of the bracket 32 and the swing arm 7. In particular, the bracket 32 includes a through-passage 36 for receiving a shaft 5. The pivot point is made up of a pair of polyurethane bushings 3 with a pivot axle thru shaft 5, and includes bolts 1 and washers 2 that hold the swing-arm/fuel tank 7 to the bracket 32. The bracket 32 thus serves as a pivotal attachment of the swing arm 7 (and attached motor 9) to the clamp 4. As mentioned above, this pivot point can be located adjacent the seat post 17, directly behind the clamp 4, or it can be coupled further rearward, between the clamp 4 and the motor 9.

In one embodiment, a swing arm or bracket 7 connects the motor 9 to the joint 30. In one embodiment, the swing-arm 7 includes an integrated fuel tank, fuel cell, or battery for powering the motor 9. That is, a fuel tank, fuel cell, or battery housing (i.e., the power supply) may be utilized as the swing arm 7. In such an instance, the swing arm 7 may also have a fuel filler cap 8 or a bung and cap system for the purpose of refilling with fuel or charging the battery. This swing arm 7 may be made of aluminum but may also be steel or a suitable composite material such as plastic. In the illustrated embodiment, the swing-arm/fuel tank 7 has a mounting point for engaging the joint 30, thereby attaching the swing arm 7 to the clamping system of FIG. 2. The swing arm 7 also includes a mounting point for the motor 9. The motor 9 may be mounted to the top surface of the swing arm, or to the side wall of the swing arm, or any other suitable mounting arrangement. The swing arm 7 also includes bearing supports 14 for rotatably supporting the friction spindle 13 (described below).

The motor, which may be of any configuration, is directly mounted to the swing-arm/fuel tank 7 in the illustrated embodiment. In the alternative, the motor may be mounted through bushings or other means of support. A friction drive spindle 13 is mounted directly to the output shaft of the motor. The friction drive spindle 13 is made from steel with a pattern known as knurling (see FIG. 3) cut into its circumference for traction against a bicycle wheel 19. The spindle 13 may also be manufactured from aluminum or a suitable composite of different materials. The friction drive spindle 13 in this embodiment has an apple core shape, having a concave or depressed outer surface, that allows for self-centering of the power unit while the spindle is in motion. The output shaft of the motor 9 and the friction drive spindle 13 are supported by support bearings 14, which may be located on both the outboard and inboard/motor side of the swing arm 7. The inboard and outboard bearings 14 provide support to the spindle 13, to protect the motor and output shaft from forces that may otherwise occur. In one embodiment, the spindle 13 is mounted to the motor output shaft. Mounting the spindle directly to the motor output shaft provides a simple and robust design, without extra gears or other components.

Figure 5:
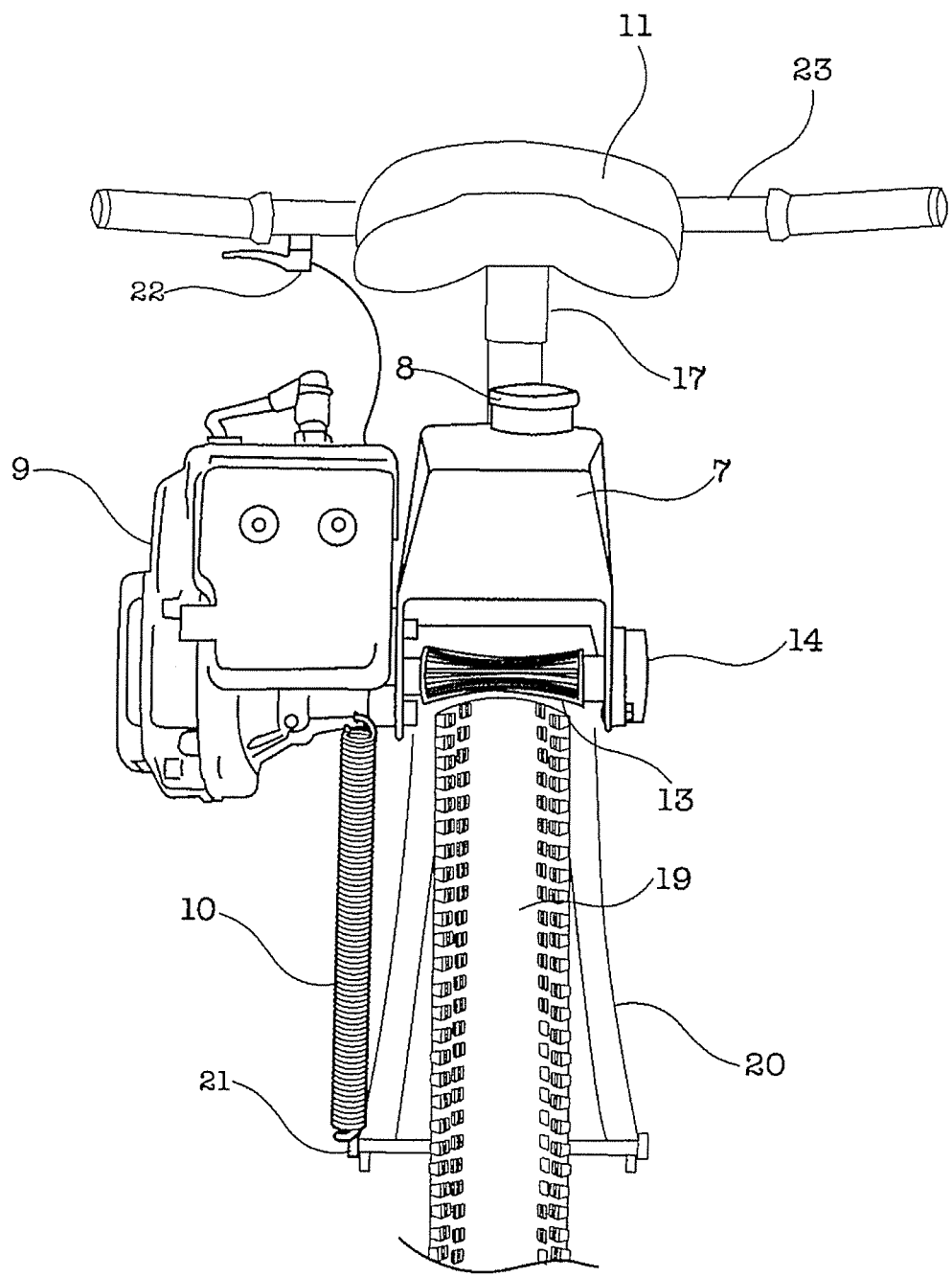
FIG. 5 is a rear elevational view of the auxiliary power drive device of FIG. 1 mounted to a bicycle.

The unit is powered by a motor 9, which may be an internal combustion engine supplied by a fuel tank, or an electric motor powered by batteries or solar panels. The internal combustion engine may be of the type used in a conventional string trimmer or other suitable powered appliance, which may be of either two stroke or four stroke design. As shown in FIG. 5, the motor 9 is controlled by way of a cable and lever system 22 not unlike a motorcycle. The lever 22 is mounted to the handlebars 23 of a bicycle using a removable clamp or a strap having a hook and loop attachment system. The user can operate the lever 22 to increase the power supplied to the motor 9, thereby increasing or decreasing the bicycle's speed.

Figure 6:
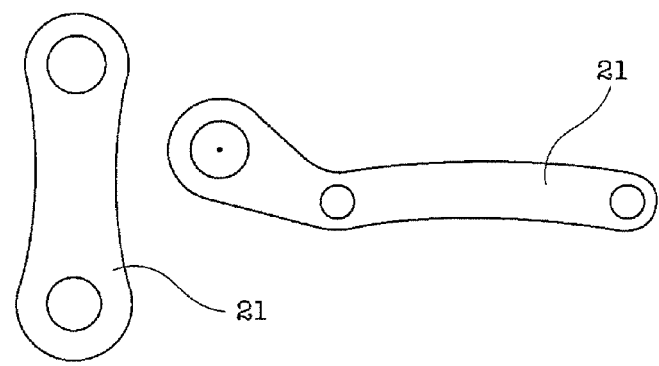
FIG. 6 is a perspective view of brackets that mount to a bicycle frame or axle to connect a tension spring for downward force as seen in FIG. 1.

The weight of the motor 9 and swing arm 7 tends to press the spindle 13 against the tire 19. However, to provide additional friction between the spindle and the tire, in one embodiment, a tension spring 10 (such as a coil spring) is provided to further urge the spindle against the tire. In one embodiment, the spring 10 is attached at one end to the drive unit (such as being attached to the swing arm 7, either on the motor side or the opposing side) and at the other end to the bicycle wheel axle, or to a spring bracket 21 mounted to the bicycle as illustrated in FIGS. 1, 5, and 6. The spring bracket 21 serves to connect the tension spring 10 to the bicycle axle or frame 20 in a universal manner. The spring provides an additional downward force on the friction drive spindle 13 to create an intimate and non-slipping contact between the spindle and the tire. In this way, the force required to drive the bicycle forward is efficiently transmitted to the bicycle tire without loss of motion, and without damaging or adversely affecting the life of the tire. The spindle 13 contacts the tire at the outer tread of the tire, rather than the side wall of the tire. Contact along the outer tread of the tire prevents accelerated wear of the tire, as the contact between the spindle and the tire takes place at the tread, where the tire is designed to sustain contact with the road surface.

Upon reaching a destination, it is common practice for cyclists to lock bicycles in order to prevent theft. The presence of a power unit on an unattended bicycle could make the bicycle a more attractive target, creating a security issue if the power unit is left on the bicycle when the bicycle is parked. In embodiments as described above, the clamp system 4 enables the power unit to be easily removed and transported away from the bicycle when the bicycle is parked or stored. The power unit can be separately locked or stored away from the bicycle, reducing the risk of theft of the bicycle or the power unit. The power unit can be re-attached to the bicycle when the user is ready to leave, or the bicycle can be subsequently used in a conventional manner, without the power unit attached. The power unit can be safely stored away from the bicycle, and can be used with other, different bicycles as desired. The clamp system 4 and the pivotal joint 30 enable the power unit to be quickly and easily attached to a new bicycle with different dimensions, size, and geometry (including bicycles with or without suspension systems).

In one embodiment, the joint 30 pivots about a horizontal axis, allowing the swing arm 7 and motor 9 to rotate in a vertical plane. In one embodiment, the rotational axis of the joint, the bicycle wheel axis, and the rotational axis of the spindle 13 are all parallel, and in one embodiment they are all horizontal. Also, in one embodiment, the spindle 13 contacts the bicycle tire at or behind the wheel axle. This geometry, with the swing arm 7 extending from the joint 30 to the spindle 13 at or behind the axis of the bicycle wheel, provides a stable configuration of the motor, swing arm, spindle, and joint as the spindle drives the wheel. The concave shape of the outer surface of the spindle also creates a stable contact of the spindle against the wheel. This design maintains contact between the spindle and the tire, even as the system pivots at joint 30, thereby reducing losses due to slipping, and reducing inefficient tire wear.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A power unit for a bicycle having a seat post and a wheel with an axis, the power unit comprising:
   a motor having an output shaft configured to drive the wheel;
   a clamp dimensioned to clamp to the seat post of the bicycle;
   a pivotal joint coupled to the clamp;
   a swing arm coupling the pivotal joint to the motor, the swing arm including a power supply selected from the group consisting of a fuel tank, a fuel cell, and a battery, the joint being pivotable about a horizontal axis parallel with the axis of the wheel, for movement of the motor with respect to the clamp.

2. The power unit of claim 1, wherein the output shaft of the motor is coupled to a spindle for engaging the wheel.

3. The power unit of claim 2, wherein the wheel comprises a tire with an outer tread, and wherein the spindle comprises a concave surface for frictionally engaging the tread.

4. The power unit of claim 3, further comprising a spring coupled to the spindle for biasing the spindle against the tire.

5. The power unit of claim 1, wherein the output shaft of the motor rotates about an axis that is parallel to the axis of the wheel.

6. The power unit of claim 1, wherein the clamp and the pivotal joint are provided on a bracket.

7. A bicycle system having a power unit for driving the bicycle, comprising:
   a bicycle including a frame, a wheel coupled to the frame, a seat tube coupled to the frame, and a seat post received by the seat tube, wherein the wheel is configured to rotate about a wheel axis; and
   a power unit removably attached to the bicycle, the power unit comprising:
      a motor operatively coupled to the wheel to rotate the wheel;
      a clamp coupled to the seat post;
      a joint coupled to the clamp;
      a swing arm coupling the joint to the motor, wherein the swing arm and the motor are configured to pivot about the joint;
      a spindle operatively coupled to the motor for rotation by the motor, the spindle configured to frictionally engage a tire on the bicycle; and
      a bearing coupled to the swing arm, wherein an inboard end of the spindle is coupled to an output shaft of the motor and an outboard end of the spindle is rotatably supported by the bearing.

8. The bicycle of claim 7, wherein the joint allows pivoting of the motor about a horizontal axis.

9. The bicycle of claim 7, wherein the spindle comprises a concave surface for receiving the tread of the tire.

10. The bicycle of claim 7, wherein the spindle engages the tire at or behind the wheel axis.

11. The bicycle of claim 7, wherein the spindle rotates about an axis that is parallel with the wheel axis.

12. The bicycle of claim 11, wherein the joint pivots about an axis that is parallel with the spindle axis and the wheel axis.

13. The bicycle of claim 7, wherein the power unit further comprises a power source coupled to the arm and operatively connected to the motor to power the motor.

14. The bicycle of claim 13, wherein the power source comprises a fuel tank, a fuel cell, or a battery integrated into the arm.

15. The bicycle of claim 7, wherein the clamp is a quick-release clamp engageable to and removable from the seat post without the use of external tools.

* * * * *